United States Patent Office 2,739,037
Patented Mar. 20, 1956

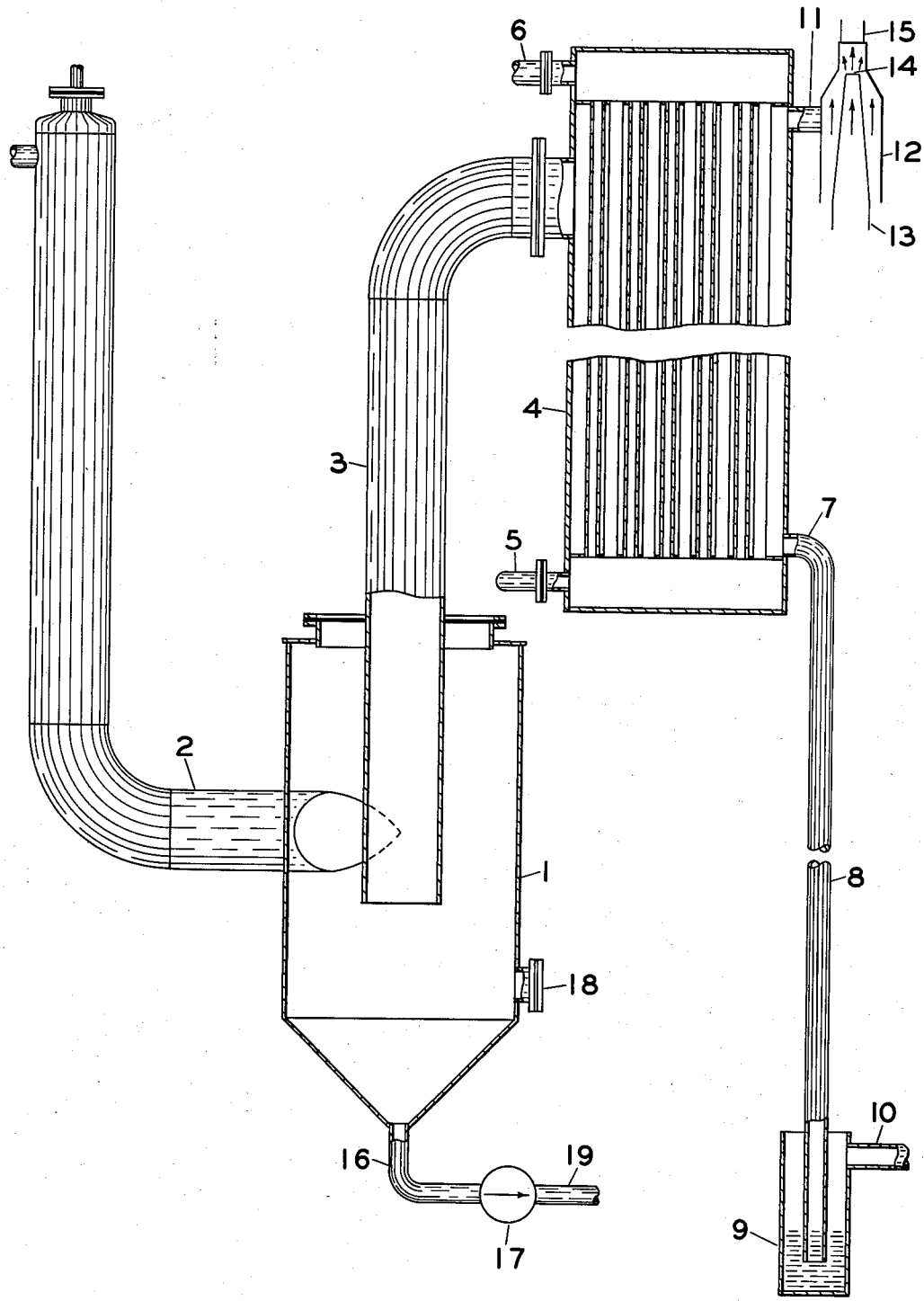

2,739,037

PROCESS FOR PRODUCTION OF AMMONIUM NITRATE

Leonard A. Stengel, Terre Haute, Ind., and John J. Dorsey, Jr., Monroe, La., assignors to Commercial Solvents Corporation, Terre Haute, Ind., a corporation of Maryland Application January 22, 1953, Serial No. 332,774

2 Claims. (Cl. 23—103)

Our invention relates to an improvement in a process for producing ammonium nitrate. More particularly, it relates to an improvement in a single step process for the preparation of substantially dry ammonium nitrate from ammonia and nitric acid solutions.

In United States Patent No. 2,568,901 there is described a process for the preparation of ammonium nitrate by a safe, economical method involving the direct interaction of ammonia and nitric acid at elevated temperatures, such a process having been thought theretofore impossible due to the tendency of ammonium nitrate to decompose at or above its melting point. The process of the above-mentioned patent consists essentially of continuously passing a mixture of nitric acid and ammonia under intimate contact conditions through a reactor tube which is free to drain at its lower end so that it is maintained substantially free from liquid reaction products. The reaction products are removed in two phases, one of which is substantially steam and the other of which is a molten ammonium nitrate, the water content of which is reduced to a minimum if the temperature of the reaction zone is maintained at a high level consistent with the decomposition temperatures of the reactants and reaction products.

If the temperature in the reaction zone employed in the above-described process is maintained at a high enough level, an ammonium nitrate product having a very low moisture content can be produced. It has been found, however, that to obtain ammonium nitrate products of such low moisture content, it is necessary to raise the temperature in the reaction zone to a point above the decomposition temperature of the nitric acid reactant and ammonium nitrate product so that ultimate loss in product yield results.

We have now discovered a means whereby the moisture content of the ammonium nitrate product can be reduced without employing extremely high temperatures in the reaction zone and therefore we are able to produce an ammonium nitrate product of low moisture content without sustaining loss in yield from decomposition of the ammonium nitrate product or the nitric acid reactant introduced. A further advantage of our new process is that we do not in any way interfere with the basic step of producing molten ammonium nitrate and steam by interacting ammonia and nitric acid at elevated temperatures.

Our new process consists essentially of passing the steam and molten ammonium nitrate coming from the reactor in the process of U. S. Patent 2,568,901, described above, into a steam separator maintained under vacuum and at an elevated temperature, the residence time of the molten ammonium nitrate in the separator being maintained below about five seconds.

The steam separator into which we pass the mixture of molten ammonium nitrate and steam can be any of the conventional type consisting essentially of a closed vessel having an inlet for the mixture of molten ammonium nitrate and steam as well as an outlet at or near the top for the steam and an outlet at or near the bottom for the molten ammonium nitrate. A conventional cyclone steam separator of the usual design is adequate for use in our process and we have employed such a separator with outstanding results. The vacuum in the steam separator can be provided by any convenient means such as by means of a vacuum pump, a barometric condenser on the steam outlet line, etc. We prefer to employ a conventional seal leg for moderate vacuums such as from about 20 inches of mercury absolute to atmospheric pressure. With the separator under vacuum, it is of course necessary to pump the molten ammonium nitrate therefrom and this can be accomplished by any convenient means such as by use of any conventional pump providing an adequate pumping pressure to overcome the vacuum or by means of an immersion pump inside of the separator, the pump suction in such case being below the level of molten ammonium nitrate in the separator. It is of course obvious that many efficient arrangements can be made to operate the separator under vacuum and economically and efficiently remove the molten ammonium nitrate and steam therefrom and we intend for all such arrangements and designs to be included within the scope of this specification and the attached claims.

One example of a system which we have found suitable for the operation of our process is shown in the accompanying drawing. In this system, the mixture of steam and molten ammonium nitrate enters the steam separator 1 tangentially from the reactor 2. The molten ammonium nitrate settles to the bottom of the separator 1 while the steam exits through the top through line 3 to the condenser 4 having a cooling water inlet 5 and exit 6. The condensate exits from the condenser through outlet 7 to a vertical pipe 8 which acts as a barometric leg. A seal is maintained by seal pot 9 having an overflow exit 10. Because of the presence of non-condensables in the steam coming from the separator an outlet 11 from the condenser is provided. A steam ejector 12 is attached to line 11 to initiate and maintain the vacuum on the system. In the ejector 12, steam enters through line 13 passing through jet 14, and the mixture of non-condensables and steam exits through line 15 from the ejector and condenser. The molten ammonium nitrate which settles to the bottom of the separator 1 is pumped therefrom through line 16 by the pump 17, a level being maintained as a seal. The sight glass 18 enables ascertainment of the level. The molten ammonium nitrate is pumped through line 19 for further processing as desired.

We have found in the operation of our new process that a vacuum in the separator amounting to a pressure of 23 inches of mercury absolute will materially reduce the moisture content of the molten ammonium nitrate. By means of larger vacuum (lower absolute pressure) we are further able to reduce the moisture content of the molten ammonium nitrate product, the lower vacuum limit (upper absolute pressure limit) being 23 inches of mercury absolute.

As indicated, an elevated temperature in the separator is required, and consequently the temperature in the separator is maintained at a level ranging from between about 350° F. to about 425° F. The reaction of nitric acid and ammonia to produce ammonium nitrate is an exothermic reaction and consequently large amounts of additional heat are not necessary to maintain the temperature in the separator to within the required range, particularly if the reactants are preheated. External heat can be applied to the separator by means of an electric heating coil, a jacket around the separator through which super-heated steam or heated oil, etc., is passed or any other suitable means can be employed for raising the temperature of the separator to a level within the desired range. Since vacuum is employed in our process we are able to avoid the exceptionally high temperatures previously necessary, at which temperatures rapid decomposition of ammonium nitrate occurs.

It is of course recognized that ammonium nitrate when maintained at high temperatures of the order discussed above is subject to some decomposition depending on the temperature and the length of time the molten ammonium nitrate is subjected to such a temperature. For the conditions of temperature disclosed and described above, we have found that decomposition of the molten ammonium nitrate is maintained at a minimum if the residence time of the molten ammonium nitrate in the separator is kept at or below about 5 seconds, after which it is removed from the separator and cooled to temperatures below which decomposition occurs.

The following examples are offered to illustrate our invention and we do not intend for our invention to be construed as being limited to specific materials, amounts or procedures except as they may be specifically limited in this specification or the attached claims.

EXAMPLE I

Nitric acid of a concentration of 58.4%, preheated to 250° F., and ammonia preheated to a temperature of 435° F. were passed downwardly through a vertical stainless steel tube seven feet long having an outside diameter of 2.5 inches and a wall thickness of 0.65 inch. The reactor was packed with 0.25 inch burl saddles. Molten ammonium nitrate and steam flowed from the reactor, the ammonium nitrate at a rate of 363 pounds per hour. The acid feed rate to the reactor was 500 lbs. per hour. The molten ammonium nitrate and steam flowed directly into a conventional cyclone steam separator having a straight side of 24 inches, an inside diameter of 8 inches and a conical bottom. The separator was maintained at a temperature of 400° F. and operated at atmospheric pressure for one run and at an absolute pressure of 23 inches of mercury for another run. The molten ammonium nitrate product coming from the separator when the separator was operated at atmospheric pressure had a moisture content of 2.4% while the molten ammonium nitrate coming from the separator when the separator was operated at the above-stated vacuum was 1.75%.

EXAMPLE II

Nitric acid having a concentration of 58.4% and preheated to a temperature of 250° F. was reacted at the rate of 500 lbs. per hour with ammonia preheated to a temperature of 427° F. to produce molten ammonium nitrate at a rate of 363 lbs. per hour, the molten ammonium nitrate flowing from the reactor into a steam separator. The reactor and steam separator were the same as described in Example I. The separator, maintained at a temperature of 390° F., was operated at atmospheric pressure, then at pressures of 22.9 inches of mercury absolute, 21.9 inches of mercury absolute and 20.9 inches of mercury absolute. The moisture content of the molten ammonium nitrate coming from the separator at the various pressures is shown in the following table.

Table

| Absolute Pressure, Inches Mercury | Product Moisture, Weight Percent |
|---|---|
| Atmospheric | 2.88 |
| 22.9 | 2.32 |
| 21.9 | 2.23 |
| 20.9 | 2.12 |

Now having described our invention what we claim is:

1. In a process for producing ammonium nitrate by reacting ammonia vapors with nitric acid at a pressure of at least atmospheric pressure in a packed reaction zone and continuously removing steam and molten ammonium nitrate therefrom as reaction products, the improvement which comprises passing the said reaction products directly from the reactor into a steam separator maintained at a temperature ranging from about 350° F. to about 425° F. and at a pressure below about 23 inches of mercury absolute, the residence time of the molten ammonium nitrate in the separator being maintained below about five seconds.

2. In a process for producing ammonium nitrate by reacting ammonia vapors with nitric acid at a pressure of at least atmospheric presure in a packed reaction zone and continuously removing steam and molten ammonium nitrate therefrom as reaction products, the improvement which comprises passing the said reaction products from the reactor to a steam separator heated so that the temperature of the reaction products is maintained in the range from about 350° F. to about 425° F., the pressure in the separator being maintained below about 23 inches of mercury absolute and the residence time being maintained below about five seconds.

References Cited in the file of this patent

UNITED STATES PATENTS

| Re. 21,217 | Fauser | Sept. 26, 1939 |
| 2,568,901 | Stengel | Sept. 25, 1951 |

OTHER REFERENCES

Chemical Engineering, August 1952, page 215.